United States Patent [19]

Partenheimer

[11] 4,228,091

[45] Oct. 14, 1980

[54] REMOVAL OF NICKEL FROM COBALT AND MANGANESE

[75] Inventor: Walter Partenheimer, Naperville, Ill.

[73] Assignee: Standard Oil Company (Indiana), Chicago, Ill.

[21] Appl. No.: 1,953

[22] Filed: Jan. 8, 1979

[51] Int. Cl.$^2$ .................. C07F 15/04; C07F 15/06; C07F 11/00

[52] U.S. Cl. ............... 260/439 R; 423/140; 562/414

[58] Field of Search .............. 260/439 R; 423/140; 562/414

[56] References Cited

U.S. PATENT DOCUMENTS

| | | | |
|---|---|---|---|
| 3,163,671 | 12/1964 | Fragen et al. | 562/414 |
| 3,369,876 | 2/1968 | Grimm | 260/439 R X |
| 3,380,801 | 4/1968 | Williams et al. | 260/439 R X |
| 3,557,200 | 1/1971 | Bersworth | 260/439 R X |
| 3,673,154 | 6/1972 | Trevillyan | 260/439 R X |
| 3,687,992 | 8/1972 | Feiler et al. | 260/429 J X |
| 3,703,573 | 11/1972 | Blytas | 260/439 R X |
| 3,719,694 | 3/1973 | Feiler et al. | 260/439 R X |
| 3,728,366 | 4/1973 | Michlmayr | 260/439 R |
| 3,880,920 | 4/1975 | Wampfler | 423/140 |
| 3,919,306 | 11/1975 | Johnson et al. | 562/414 |
| 3,956,175 | 5/1976 | Shigeyasu et al. | 423/140 |

OTHER PUBLICATIONS

Martell et al., Chemistry of the Metal Chelate Compounds, Prentice-Hall, Inc. N.Y., pp. 468 & 469 (1952).

*Primary Examiner*—Helen M. S. Sneed
*Attorney, Agent, or Firm*—Fred R. Ahlers; William T. McClain; William H. Magidson

[57] ABSTRACT

This invention relates to the removal of nickel, iron and copper co-dissolved with cobalt or manganese, or cobalt and manganese in water so that cobalt, manganese, or cobalt and manganese can be precipitated as carbonates and then converted to their acetates sufficiently low in nickel, iron and copper so that said acetates can be recycled to the liquid phase air oxidation of a di- or trimethyl benzene to its corresponding di- or tricarboxylic acid without material inhibition of such oxidation.

4 Claims, No Drawings

REMOVAL OF NICKEL FROM COBALT AND MANGANESE

BACKGROUND OF THE INVENTION

British Pat. No. 1,413,488 published Nov. 12, 1978 and U.S. Pat. No. 3,673,154 indicate that the presence of iron, chromium, nickel and copper are undesirable contaminants of cobalt, or manganese, or cobalt and manganese oxidation catalyst metals used for the liquid phase oxidation of m- or p-xylene with air to the respective iso- or terephthalic acid.

In the production of those acids from the oxidation of the respective xylenes, the British Patent teaches a method of metal catalyst recovery which, for example, recovers cobalt containing no more than 120 ppm of copper, 1600 ppm of iron, 10,000 ppm of nickel and 10,000 ppm chromium on a weight basis and is said to be suitable for recycle to the oxidation without material inhibition of the foregoing xylene. The method of the British Patent comprises extracting the residue left after iso- or terephthalic acid product separation and removal of reaction solvent (e.g. acetic acid) with aqueous alkali (e.g., sodium) carbonate at a pH of 7-8 in the presence of air or up to 9.5 in the absence of oxygen which would at the higher (8 to 9.5) pH cause the formation of manganese oxide. After removal of aqueous extract solution there remains as a solid residue a mixture of carbonates of iron, manganese and cobalt. Said mixed metal carbonate residue is dissolved in 1.05 to 1.2 times the stoichiometric amount of acetic acid, preferably acetic acid containing 40 to 50 weight percent water, required to convert the metal carbonates to their acetates. Thereafter the solution is heated to distill off acetic acid until a solution pH of from 4.5 to 5.8 is reached at which pH an insoluble form of iron precipitates. Such method is illustrated as recovering 93.8% of cobalt and 97.9% of manganese (in their dissolved acetates in acetic acid) with an iron content of 0.575 ppm of the cobalt recovered from a starting residue (before aqueous sodium carbonate extraction) having an iron content of 14300 ppm of the cobalt content.

The above United States Patents heats to 93° C. a residue containing acetic acid, 0.58 to 1.7 weight percent cobalt, 84 to 270 ppm of iron, 16 to 51 ppm of chromium, 13 to 40 ppm of nickel and acetic acid to evaporate acetic acid until the concentrated solution has a pH above 3. Such concentration causes a form of iron and a form of chromium to precipitate to the extent that 97% of the iron and 65% of the chromium are removed. However, this method did not remove nickel.

Recently in our laboratories, it has been found that in the neat oxidation of liquid o-xylene to o-phthalic acid can be inhibited by copper, or iron, or nickel in rather low amounts based on the cobalt metal oxidation catalyst. The oxidation retarding effects of said three metals in concentrations per million weight parts (ppm) of cobalt are shown in TABLE I to follow. The retardation effect is shown as mole percent of theoretical oxygen consumed.

TABLE 1 o-XYLENE OXIDATION RETARDING EFFECT OF Cu, Fe and Ni

| Metals Concentration in parts per $1 \times 10^6$ parts of Co | Mole % Theoretical Oxygen Consumed |
| --- | --- |
| Cu, 80 ppm | 113 |
| Cu, 800 ppm | 67 |
| Cu, 8000 ppm | 65 |
| Cu, 9100 ppm | 42 |
| Cu, 80,000 ppm | 28 |
| Fe, 500 ppm | 116 |
| Fe, 5000 ppm | 103 |
| Fe, 50,000 ppm | 70 |
| Ni, 6700 ppm | 112 |
| Ni, 67,000 ppm | 68 |

Thus for such neat oxidation of liquid o-xylene with air there should not be present in the original or recycle catalyst an amount of copper in the range of from 80 up to 8000, or of iron in the range of from 5000 up to 50,000, and/or of nickel in the range of from 6700 up to 67,000 weight parts per million weight parts of cobalt.

The problem left by the prior art is how to remove the nickel to the safe level of about 6700 ppm, that is, a nickel content of not more than 6700 ppm of the cobalt and to remove the copper to a safe level of about 80 ppm, that is, not more than 100 ppm, preferably not more than 80 ppm, of the cobalt.

STATEMENT OF THE INVENTION

We have discovered that an aqueous solution containing cobalt, manganese, copper, nickel, and iron having more copper than 80 to 100 ppm, more nickel than 6700 ppm and more iron than 500 to 5000 ppm of the cobalt can be treated to remove nickel as well as copper and iron. Said method of removing nickel comprises adding to said solution, before or after copper and iron removal, of at least 2.5 gram moles and up to 10 gram moles of nitrilotriacetate (NTA) for each 1.0 gram atom of total contaminant metals present in solution and thereafter precipitating cobalt and manganese as their carbonates.

While copper can be precipitated as its sulfide from the aqueous solution by the addition thereto of hydrogen sulfide and separating the aqueous solution from the solid copper sulfide precipitate, it is preferred to remove the copper by the technique of copending patent application Ser. No. 3,366, filed Jan. 15, 1979. Said preferred copper removal technique comprises contacting the aqueous solution containing copper, nickel, iron, cobalt and manganese with particulated iron (e.g., iron filings or iron cuttings) at a solution pH between 5 and 7, preferably at a pH of 6, for not more than 60 minutes. The preferred time of contact between the aqueous solution and particulated iron is from 10 up to 60 minutes. In 30 to 60 minutes the copper concentration can be decreased below detectable limits (detectable limit is 1.0 ppm) by copper plating out on the iron. Other metals can, of course, plate out on the iron but copper plates out first. For example cobalt begins to plate out after 1200 minutes and from 1275 minutes and thereafter a significant decrease in cobalt and nickel concentrations by their plating out also occurs. An increase in the iron content of the solution appears after sixty minutes of contact. Such preferred removal of copper from aqueous solution can be accomplished before or after, preferably before, the removal of nickel according to the present inventive use of NTA.

The iron content of the aqueous solution is, of course, precipitated with the cobalt and manganese when they are converted to their carbonates. However, the iron can be readily separated from cobalt and manganese by the technique of British Pat. No. 1,413,488. Also the iron content of the aqueous solution can be suitably decreased, before such carbonate precipitation, by the techniques of U.S. Pat. No. 3,673,154 by adding acetic acid or anhydride to the solution until a pH of above 3 (e.g., a pH from 3.1 to 4.5), heating the pH adjusted mixture to a temperature of 93° C. for 15 minutes and then removing by filtration the precipitated form of iron.

The nickel removal concept of this invention is based on the addition to the aqueous solution containing ions of cobalt, manganese and nickel and possibly iron and copper of a ligand which would react preferentially with one or more of the contaminant metals (copper, iron, and/or nickel) keeping the contaminant metal soluble when the cobalt and manganese are precipitated as their carbonates. The ability of a given metal to react with a given ligand in water is governed by the magnitude of its equilibrium constant between the ligand and metal (usually called "stability constants"). The stability constants for hundreds of such combinations of metals and ligands are found in the publication "Stability Constants", Special Publication Nos. 17 and 25 of the Chemical Society, London edited by Lars G. Sillen and Arthur E. Martell. One will find in general that the stability constants of a given ligand with the metals of interest generally have the relative magnitudes Fe Cu Ni Co Mn. As a result, a given ligand when placed in water will preferentially react with all the impurity metals rather than cobalt and manganese if the concentrations of all the metals are the same. By use of such constants in thermodynamic calculations one finds that in most cases a given ligand prefers the impurity metals when the impurity metal concentrations are considerably less than that of cobalt and manganese as one normally finds in solutions of interest. Not only must the given ligand preferentially react with the impurity metals (iron, copper and/or nickel), but it must solubilize the metal somewhat during addition of carbonate. One finds by thermodynamic calculations that the ability for a ligand to solubilize a metal during carbonate addition is directly proportional to the magnitude of the stability constant of the ligand and metal. One can conclude for example that the relative solubilizing effect increases with the ligands oxalate (hereafter "OXA"), nitrilotriacetate (hereafter "NTA"), and ethylenediaminetetraacetate (hereafter "EDTA").

From the tables to follow it is seen that oxalate (at the amounts of OXA added) does selectively solubilize the impurity metals but does not solubilize the impurity metals enough. EDTA does solubilize the metals but does not do so selectively. NTA has both the selectivity toward nickel and the solubilizing ability toward nickel to make it useful to separate nickel from the other metals.

In each of the following four examples (three comparative examples and one illustrative example) the starting aqueous solution was the same and had the following composition wherein the concentrations of metals other than cobalt are also shown in weight ratios per $1 \times 10^6$ weight parts of cobalt.

TABLE II

| | | |
|---|---|---|
| Cobalt | 2380 ppm | $1 \times 10^6$ |
| Chromium | 19 ppm | $8 \times 10^3$ |
| Copper | 10 ppm | $4.2 \times 10^3$ |
| Iron | 87 ppm | $37 \times 10^3$ |
| Manganese | 4100 ppm | $1.7 \times 10^6$ |
| Nickel | 36 ppm | $15 \times 10^3$ |

TABLE III

CARBONATE PRECIPITATION WITH NO SOLUBILIZING LIGAND 5.4 MOLES CARBONATE PER GRAM MOLE CO AND MN

| Metal | % Metals Remaining in Solution |
|---|---|
| Cobalt | 0.3 |
| Chromium | 7.4 |
| Copper | 3.5 |
| Iron | 1.2 |
| Manganese | 0.03 |
| Nickel | 2.4 |

TABLE IV

CARBONATE PRECIPITATION 5.3 MOLES $CO_3$ PER GRAM ATOM COBALT AND MANGANESE

| 2.8 Moles NTA/gram atom total gram atoms Contaminant Metals | | 5.7 Moles NTA/gram atom total gram atoms Contaminant Metals | |
|---|---|---|---|
| Metal Remaining in Soln., % | | Metal Remaining in Soln., | |
| Cobalt | 10.3 | Cobalt | 21 |
| Chromium | 2.6 | Chromium | 0.3 |
| Copper | 27 | Copper | 30 |
| Iron | 0.6 | Iron | 1.3 |
| Manganese | 0.04 | Manganese | 0.07 |
| Nickel | 83 | Nickel | 92 |
| Composition of Precipitate Basis: Cobalt = $1 \times 10^6$ | | Composition of Precipitate Basis: Cobalt = $1.0 \times 10^6$ | |
| Chromium | 13,000 | Chromium | 15,000 |
| Copper | 3,300 | Copper | 3,800 |
| Iron | 56,000 | Iron | 51,000 |
| Manganese | 2,000,000 | Manganese | 2,260,000 |
| Nickel | 6,400 | Nickel | 6,800 |

TABLE V

CARBONATE PRECIPITATION 5.4 MOLES $CO_3$ PER GRAM ATOM COBALT AND MANGANESE

| 2.7 Moles OXA/gram atom total gram atoms Contaminant Metals | | 5.5 Moles OXA/gram atom total gram atoms Contaminant Metals | |
|---|---|---|---|
| Metal Remaining in Soln., % | | Metal Remaining in Soln., % | |
| Cobalt | 0.3 | Cobalt | 0.9 |
| Chromium | 2.6 | Chromium | 6.1 |
| Copper | 8.2 | Copper | 5.0 |
| Iron | 0.8 | Iron | 1.0 |
| Manganese | 0.02 | Manganese | 0.04 |
| Nickel | 7.7 | Nickel | 14 |

TABLE VI

CARBONATE PRECIPITATION 5.7 MOLES $CO_3$/GRAM ATOM COBALT AND MANGANESE
5.7 Moles EDTA/gram atom total gram atoms of Contaminant Metals

| Metals Remaining in Soln., % | | Metals in Precipitate: Co = $1 \times 10^6$ | |
|---|---|---|---|
| Cobalt | 29.6 | Chromium | 17.00 |
| Chromium | 4.9 | Copper | 4,900 |
| Copper | 13 | Iron | 71,000 |
| Iron | 1.0 | Manganese | 2,600,000 |
| Manganese | 1.1 | Nickel | 23,000 |
| Nickel | 12.1 | | |

From the foregoing it is seen that neither EDTA nor oxalate have the selective solubilizing needed for a useful ligand for decreasing contaminant metal, especially nickel, when precipitating cobalt and manganese as their carbonates.

The invention claimed is:

1. The method of recovery of cobalt or manganese or cobalt and manganese dissolved in water also containing ions of copper, iron and nickel in amounts of copper above 80 to 100 weight parts, of nickel above 6700 weight parts and of iron above 500 to 5000 weight parts each per million weight parts of cobalt by precipitating cobalt, manganese or cobalt and manganese as their carbonates, the improvement of adding to the aqueous solution before the carbonate precipitation at least 2.5 moles of nitrilotriacetate per 1.0 gram mole of total of said metals.

2. The method of claim 1 wherein the amount of nitrilotriacetate added is from 2.5 up to 10 moles per 1.0 gram mole per total of said metals.

3. The method of claim 2 wherein prior to addition of nitrilotriacetate the solution is contacted with particulated iron.

4. The method of claim 3 wherein following the carbonate precipitation of cobalt and manganese the metal carbonate precipitate is recovered from the aqueous solution, heated with aqueous acetic acid containing 50 to 60 weight percent acetic acid and 50 to 40 percent water by weight in an amount to provide 1.05 to 1.2 times the theoretical amount of acetic acid to convert the metal carbonates to acetates until a solution of metal acetates is formed, further heating the solution of acetates to evaporate acetic acid to a solution pH of 4.5 to 5.8, and separating the solution from the precipitate which forms at such pH.

* * * * *